United States Patent [19]

Chang

[11] Patent Number: 5,103,346
[45] Date of Patent: Apr. 7, 1992

[54] DETECTOR WITH 180 DETECTING RANGE

[75] Inventor: Nally Chang, Taipei, Taiwan

[73] Assignee: Everspring Industry, Taipei, Taiwan

[21] Appl. No.: 645,117

[22] Filed: Jan. 24, 1991

Related U.S. Application Data

[63] Continuation-in-part of Ser. No. 425,678, Oct. 23, 1989, abandoned.

[51] Int. Cl.[5] .......................... G02B 5/08; G01V 9/04; G08B 13/18
[52] U.S. Cl. .................................. 359/855; 359/871; 250/221; 340/567
[58] Field of Search ................ 350/613, 612, 616–618, 350/621–622, 626–627, 631–632, 245, 171, 433; 340/567, 600, 541; 250/221, 342, 353

[56] References Cited

U.S. PATENT DOCUMENTS

| | | | |
|---|---|---|---|
| 4,268,752 | 5/1981 | Herwig et al. | 250/353 |
| 4,644,147 | 2/1987 | Zublin | 250/221 |
| 4,703,171 | 10/1987 | Kahl et al. | 250/221 |
| 4,876,445 | 10/1989 | McMaster | 340/567 |
| 4,920,268 | 4/1990 | Walters et al. | 250/353 |
| 5,015,994 | 5/1991 | Hoberman et al. | 340/567 |

Primary Examiner—Bruce Y. Arnold
Assistant Examiner—James Phan
Attorney, Agent, or Firm—Asian Pacific Int'l Patent and Trademark Office

[57] ABSTRACT

A detector with 180° detecting range, including a base, a housing, a detecting lens, a drive circuit, a sensor and a signal deflector, wherein said base is L-shaped and located at a detecting position, a hole being formed on the base, a projection being formed on the housing corresponding to the hole of the base, the projection being fitted in the hole, permitting the housing to be rotated and adjusted, a semicircular detecting opening being formed at front end of the housing, the detecting lens being disposed in the detecting opening, a drive circuit being disposed in the housing, the sensor being fitted in the signal deflector and mounted on a base board of the drive circuit, a signal receiving opening being formed in front of the signal deflector to aim at the sensor, by means of the signal deflector, a signal within dead corner over 120° range being deflected toward the signal receiving opening so that the detecting range of the detector is enlarged to 180°.

2 Claims, 6 Drawing Sheets

DETECTOR WITH 180 DETECTING RANGE

CROSS-REFERENCE TO RELATED APPLICATION

This invention is a continuation-in-part application of parent patent application Ser. No. 425,678, filed on Oct. 23, 1989, now abandoned.

BACKGROUND OF THE INVENTION

In general, a conventional radiation sensitive electrical detector can be used in burglarproof, temperature sensing, illumination control and various monitor systems by means of specific circuit designs. The detecting angle of such detector is usually limited within 120° degrees of the detector axis so that the detecting function of the detector is quite restricted.

In U.S. Pat. No. 3,923,382, Harding discloses a multi-faceted mirror structure for infrared radiation detector, wherein each facet of the mirror is focused on a radiation sensing element. However, the mirror structure can only accomplish the focusing while the detecting angle range still can not be enlarged.

SUMMARY OF THE INVENTION

It is therefore an object of this invention to provide a detector with 180° degree detecting range, in which a signal deflector is disposed on a sensor of the detector. The signal deflector can deflect a so-called dead corner signal to a receiver and therefore enlarge the detecting range to 180° degrees.

DETAILED DESCRIPTION OF THE PREFERRED EMBODIMENT

Figure 1:
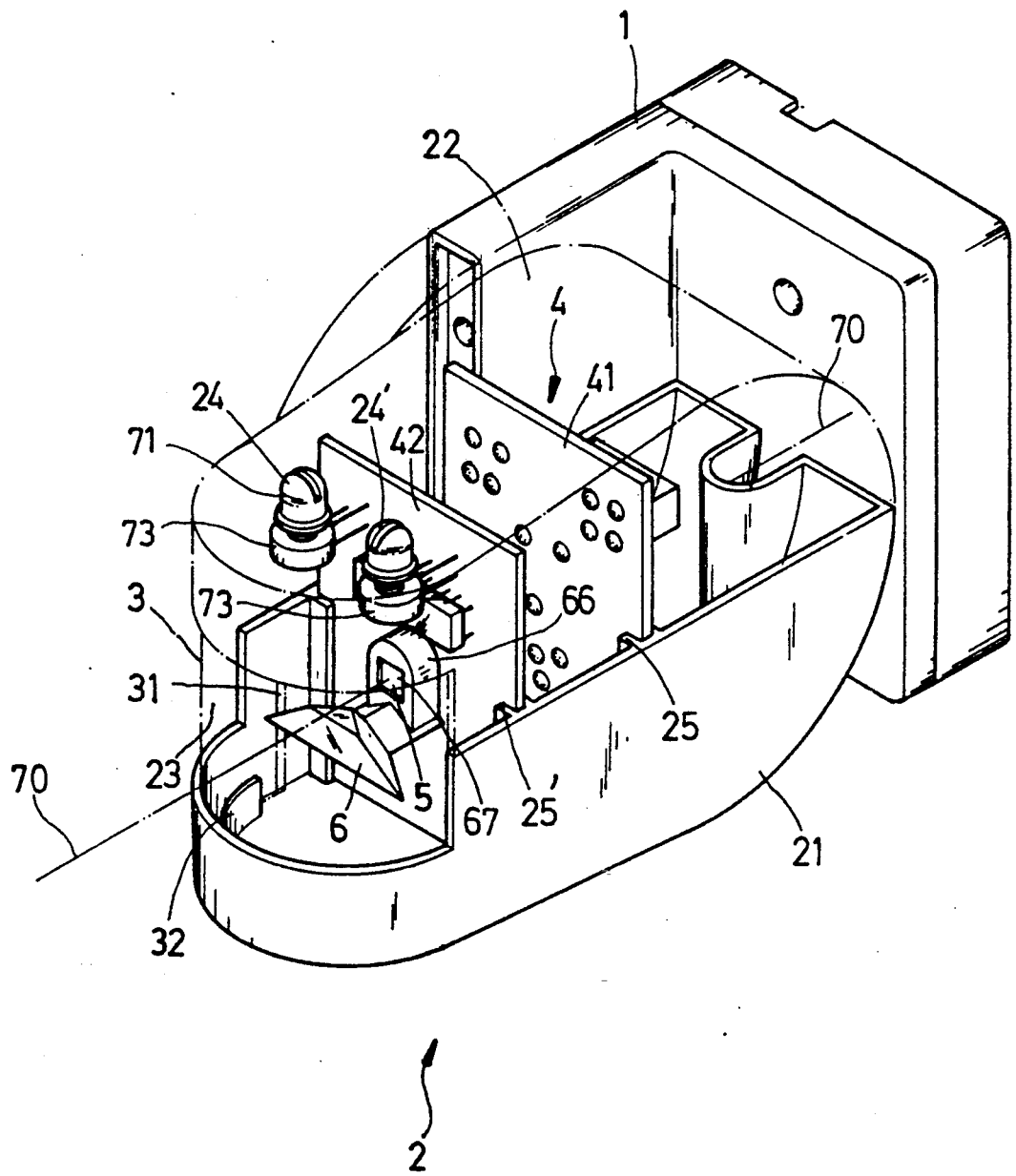
FIG. 1 is a perspective view of the inner structure of this invention.
Figure 2:
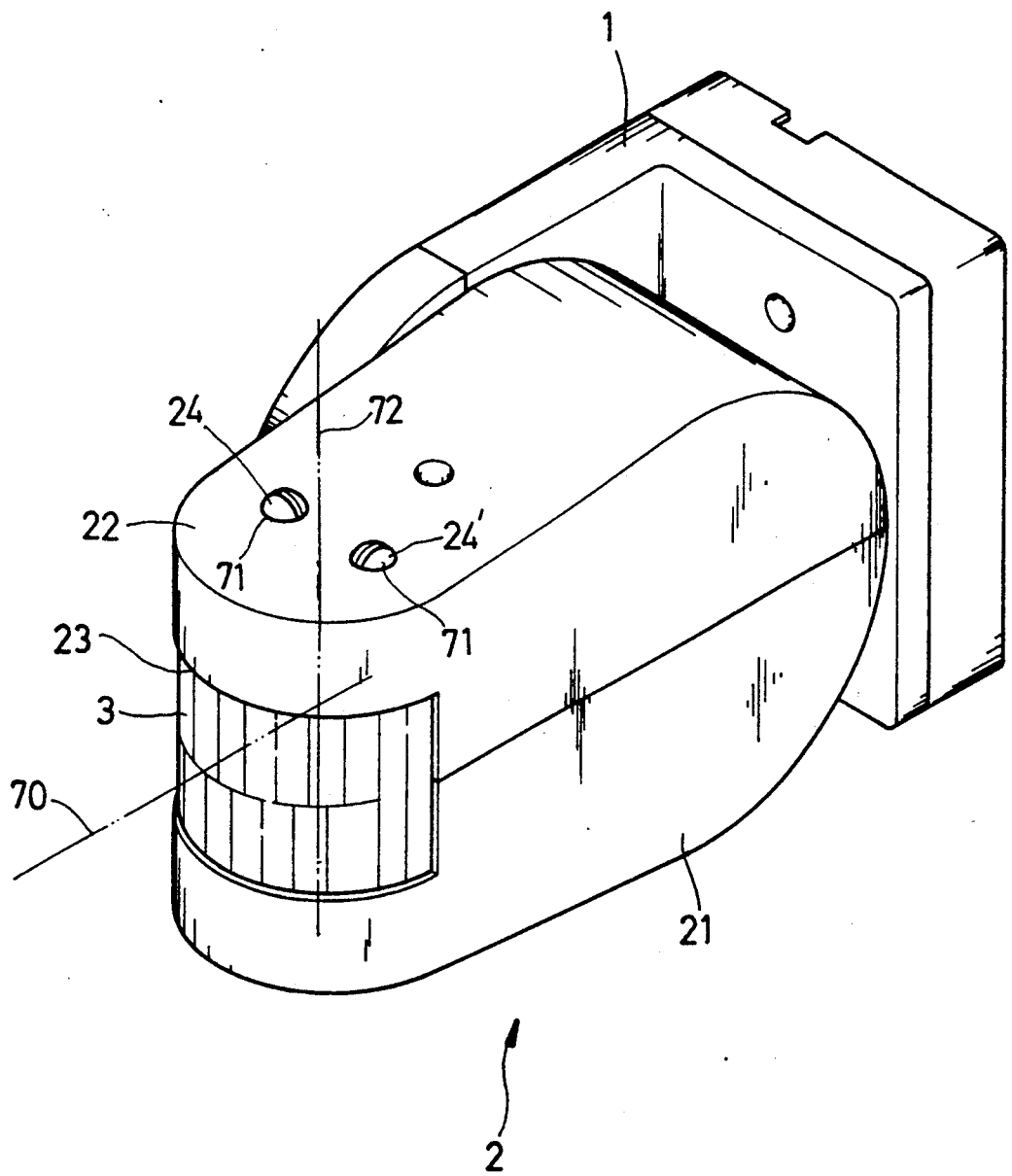
FIG. 2 is a perspective view showing the appearance of external the FIG. 1 detector assembly.

Please first refer to FIG. 1. A detector assembly of the present invention includes an L-shaped base 1 formed with a hole (not shown) and a housing 2 having a projection (not shown). The projection of the housing 2 is fitted in the hole of the base 1, permitting the housing 2 to be rotated and adjusted around an axis 70. The housing 2 includes a first hollow housing portion 21 and a second hollow housing portion 22. A semicylindrical lens 3 is disposed in a semicircular detecting opening 23 formed by cut outs in housing portions 21 and 22. The lens 3 is and held by a support 31. As indicated in FIG. 2, the imaginary axis 72 of the lens 3 cylindrical surface intersects rotation axis 70 at a right angle; the lens curvature thus has the same relation to axis 70 in any rotated position of housing 2. Two adjusting holes 24, 24' are formed on housing portion 22 behind the detecting opening 23 (as viewed in FIG. 2). On inner sides of the housing portions 21, 22 are formed several guide rails 25, 25' in which are disposed two circuit boards 41 and 42 containing a drive circuit 4. The circuit 4 mounted on the circuit boards 41 and 42, is schematically shown in FIG. 5. Two adjusting screws 71 have threaded shanks extending through holes 24, 24' in housing portion 22 into circuit adjustment devices 73 carried by circuit board 42. By applying turning forces to the screws (via a screw driver) it is possible to adjust or calibrate the circuity on board 42. A sensor 5 is mounted on circuit board within a sensor housing 66 to aim at the lens 3. A signal deflector 6 is attached to housing 66 that mounts sensor 5. Housing 66 is mounted on circuit board 42 by means of two tongs, one which is shown at 77 in FIG. 3 (the other tong extends from the non-illustrated side walls of housing 66); the two tongs can be snapped through slot openings in board 42 to attach housing 66 to the circuit board. Housing 66 and deflector 6 form a detector with 180° detecting range, as shown in FIG. 4.

Figure 3:
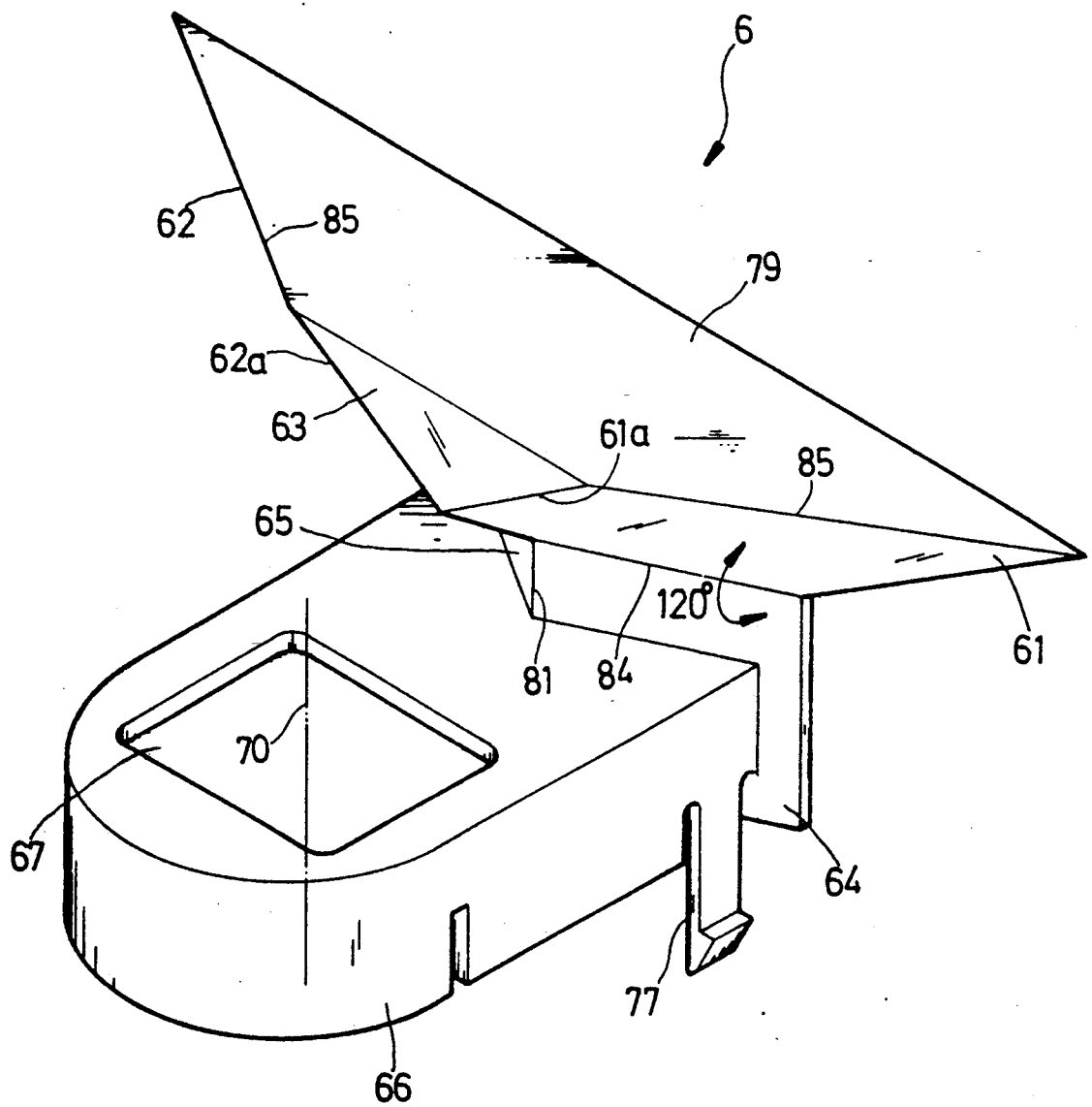
FIG. 3 is a perspective view of a signal deflector use in the FIG. 1 detector assembly.

Please now refer to FIG. 3, which shows the signal deflector 6 of the present invention. The signal deflector 6 is integrally formed with housing 66, and includes a front end having a flat front surface 79, and right and left pentagon deflector vanes 61, 62 each of which has a truncated edge surface 61a, 62a. Surfaces 79, 61 and 62 cooperatively form a V-shaped flat surface 63 that aligns with one edge of a signal receiver opening 67 in housing 66 (FIG. 4). The rear end of the deflector 6 includes two flat plates 64 and, 65, which connect with each other along a common edge 81 to form a V-shaped connector between housing 66 and deflector 6. The sensor housing 66 is disposed perpendicularly to the rear end of the deflector. A signal receiving opening 67 is formed in the front wall of housing 66. The sensor 5 is fitted within housing 66 to aim at the signal receiving opening 67 housing 66 is fixed on the base board 42 via tongs 77 (FIG. 3). The right and left deflector vane surfaces 61, 62 and the rectangular plates 64, 65 connect with one another to form a portion with 120° deflecting angle, as viewed along axis 70 of opening 67.

Figure 4:
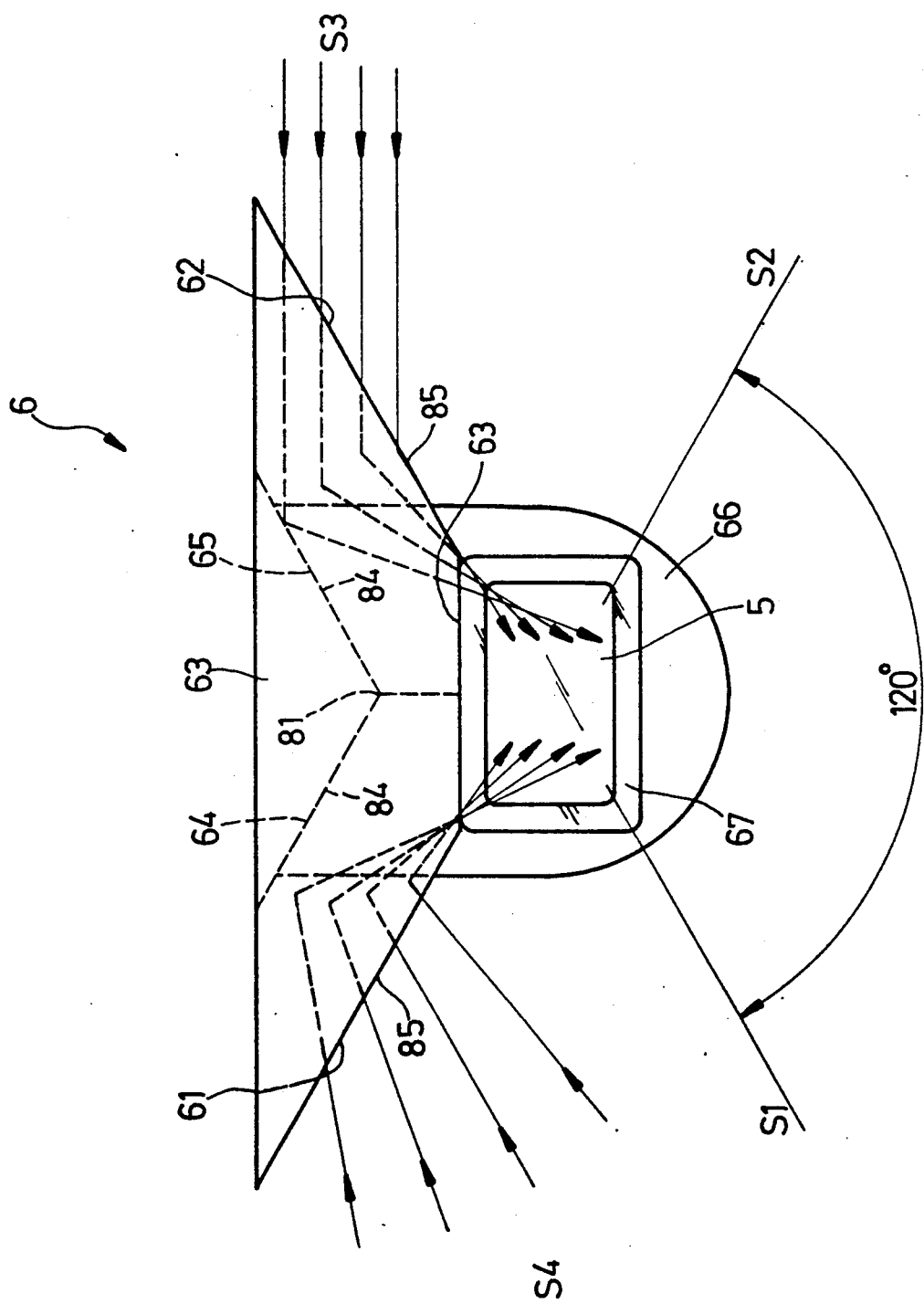
FIG. 4 is a front view of the FIG. 3 deflector showing the signal deflection pattern achieved.
Figure 5:
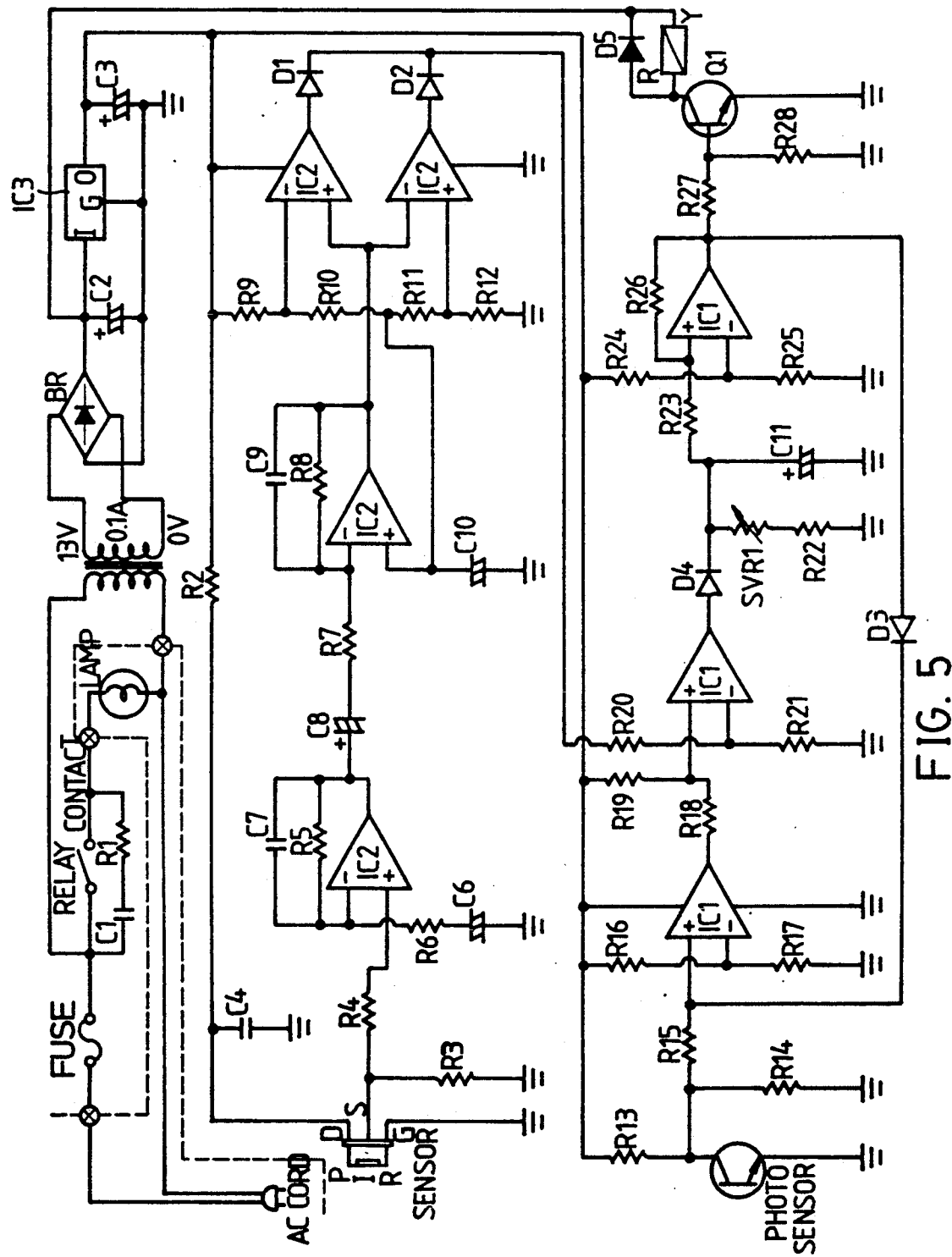
FIG. 5 is a circuit diagram of an electronic drive circuit used in the FIG. 1 detector assembly.
Figure 7:
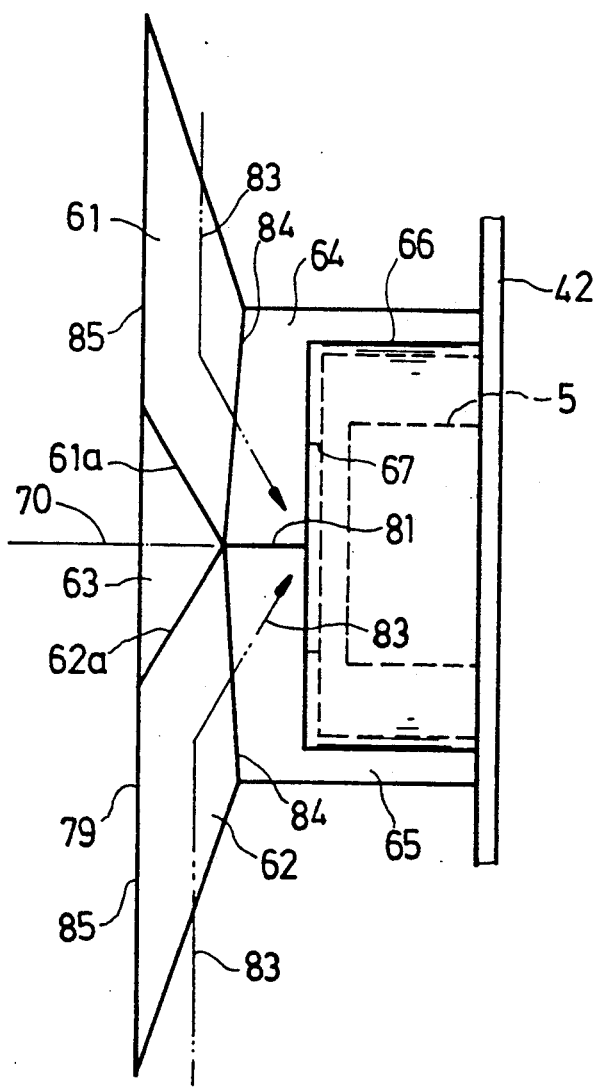
FIG. 7 is a view looking downwardly in FIG. 6.
Figure 6:
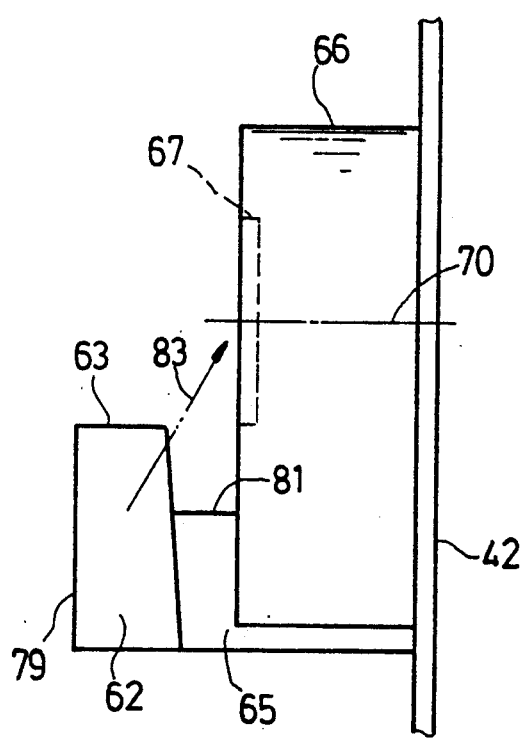
FIG. 6 is a side elevational view of the FIG. 4 deflector.

Please refer to FIG. 4, wherein the detecting angle of the sensor 5 is about 120°, i.e., a signal within 120° range between S1 and S2 can be detected directly by the sensor 5. However, a signal with an angle larger than 120°, i.e., a signal within dead corner S3, S4, should be deflected by the right and left deflector surfaces 61 and 62 toward the signal receiving opening 67. The sensor 5 then senses the incoming radiation to trigger the drive circuit 4 shown in FIG. 5 for controlling the monitor system. The advantage of the detecting system is that the detector angle is enlarged to 180°. FIGS. 6 and 7 show the deflector assembly viewed in different directions; deflection of an incoming 180 degree ray is denoted by numeral 83 in these FIGS. The desired ray deflection is achieved because deflector surfaces 61 and 62 are tilted so that rear edges 84 of the deflector surfaces form a smaller sized triangle than front edges 85 of the deflector surfaces. The size relations of these two imaginary triangles is best seen in FIG. 4.

It is apparent that various modifications could by made to the present invention without departing from the basic teachings thereof.

What is claimed is:

1. A detector assembly having an approximately 180 degrees detecting range, comprising: a base (1); a main housing (2) projecting from said base, said main housing being rotatably adjustable around an axis (70); a semicylindrical lens (3) carried on an end of said main housing remote from said base; the imaginary axis (72) of the lens curvature intersecting the main housing rotation axis at a right angle;

a circuit board (42) located within said main housing in facing relation to said semi-cylindrical lens; a sensor housing (66) mounted on said circuit board, said sensor housing having a signal receiver opening 67 located on the main housing rotation axis in a plane normal to said rotation axis; a sensor (5) within the sensor housing in alignment with the signal receiver opening; a signal deflector means (6) extending from said sensor housing into the space circumscribed by said semi-cylindrical lens; said signal deflector means comprising two flat deflector surfaces (61 and 62) angled to each other at an obtuse included angle when viewed along the axis of the signal receiver opening, each deflector surface having a front edge remote from the sensor housing and a rear edge relatively close to the sensor housing; the plane of each deflector surface being tilted so that an imaginary plane taken transversely through said front edges forms a larger sized triangle than a similar plane taken transversely through the rear edges, whereby signals impinging on the deflector surfaces at greater angles than the aforementioned obtuse angle will be deflected rearwardly toward the signal receiver opening.

2. The detector assembly of claim 1, wherein the obtuse included angle between said deflector surfaces is 120 degrees.

* * * * *